(12) United States Patent
Kim et al.

(10) Patent No.: US 9,546,601 B2
(45) Date of Patent: Jan. 17, 2017

(54) CLOCKED COMBUSTOR CAN ARRAY

(71) Applicant: General Electric Company, Schenectady, NY (US)

(72) Inventors: Won-Wook Kim, Greenville, SC (US); Kevin Weston McMahan, Greenville, SC (US); Shiva Kumar Srinivasan, Greenville, SC (US)

(73) Assignee: General Electric Company, Schenectady, NY (US)

( * ) Notice: Subject to any disclaimer, the term of this patent is extended or adjusted under 35 U.S.C. 154(b) by 855 days.

(21) Appl. No.: 13/681,453

(22) Filed: Nov. 20, 2012

(65) Prior Publication Data

US 2014/0137535 A1    May 22, 2014

(51) Int. Cl.
| | |
|---|---|
| *F23R 3/42* | (2006.01) |
| *F02C 7/24* | (2006.01) |
| *F23C 5/08* | (2006.01) |
| *F23R 3/46* | (2006.01) |

(52) U.S. Cl.
CPC . *F02C 7/24* (2013.01); *F23C 5/08* (2013.01); *F23R 3/46* (2013.01); *F23R 2900/00014* (2013.01)

(58) Field of Classification Search
CPC ............. F01D 9/023; F23R 3/42; F23R 3/425; F23R 3/46; F23R 2900/00014; F23C 5/08; F05D 2250/14; F02C 3/14; F02C 7/24
See application file for complete search history.

(56) References Cited

U.S. PATENT DOCUMENTS

| | | | |
|---|---|---|---|
| 2,072,731 A | 3/1937 | Crosby | |
| 2,475,911 A * | 7/1949 | Lewis | F23R 3/04 431/353 |
| 2,567,079 A * | 9/1951 | Owner | F23R 3/425 415/183 |
| 2,601,612 A * | 6/1952 | Imbert | F23R 3/46 60/39.37 |
| 3,000,182 A * | 9/1961 | Buswell | F23R 3/42 60/747 |
| 3,119,234 A * | 1/1964 | Murray | F23R 3/04 60/39.37 |
| 3,238,718 A * | 3/1966 | Hill | F02C 3/085 60/39.37 |

(Continued)

FOREIGN PATENT DOCUMENTS

| | | |
|---|---|---|
| CN | 1497217 A | 5/2004 |
| CN | 101818907 A | 9/2010 |

(Continued)

OTHER PUBLICATIONS

U.S. Appl. No. 13/437,954, filed Apr. 3, 2012, Kim et al.

(Continued)

*Primary Examiner* — Ehud Gartenberg
*Assistant Examiner* — Jason H Duger
(74) *Attorney, Agent, or Firm* — Sutherland Asbill & Brennan LLP

(57) ABSTRACT

The present application provides a clocked combustor can array for coherence reduction in a gas turbine engine. The clocked combustor can array may include a number of combustor cans positioned in a circumferential array. A first set of the combustor cans may have a first orientation and a second set of the combustor cans may have a second orientation.

8 Claims, 9 Drawing Sheets

(56) References Cited

U.S. PATENT DOCUMENTS

| | | | | |
|---|---|---|---|---|
| 3,657,883 A * | 4/1972 | De Corso | ............... | F23R 3/46 60/39.37 |
| 4,356,693 A * | 11/1982 | Jeffery | ............... | F23R 3/04 60/39.37 |
| 5,946,902 A * | 9/1999 | Schutz | ............... | F02C 3/14 415/151 |
| 6,572,330 B2 * | 6/2003 | Burdgick | ............... | F01D 9/02 29/889.22 |
| 6,772,583 B2 * | 8/2004 | Bland | ............... | F23R 3/46 60/39.37 |
| 6,840,048 B2 | 1/2005 | Han et al. | | |
| 7,107,773 B2 * | 9/2006 | Little | ............... | F02C 7/228 60/746 |
| 7,950,215 B2 * | 5/2011 | Chhabra | ............... | F02C 7/228 60/39.281 |
| 8,079,804 B2 * | 12/2011 | Shteyman | ............... | F01D 25/14 415/115 |
| 8,739,511 B1 | 6/2014 | Toqan | ............... | F23R 3/58 60/39.37 |
| 8,984,889 B2 * | 3/2015 | Wilbraham | ............... | F23R 3/14 60/737 |
| 9,145,778 B2 * | 9/2015 | Kim | ............... | F01D 9/023 |
| 2010/0077719 A1 * | 4/2010 | Wilson | ............... | F23R 3/425 60/39.37 |
| 2010/0192578 A1 | 8/2010 | Singh et al. | | |
| 2010/0205972 A1 * | 8/2010 | Chila | ............... | F23R 3/005 60/752 |
| 2010/0313568 A1 * | 12/2010 | Davis, Jr. | ............... | F23R 3/002 60/725 |
| 2011/0048022 A1 * | 3/2011 | Singh | ............... | F23N 5/242 60/742 |
| 2011/0072826 A1 * | 3/2011 | Narra | ............... | F02C 7/228 60/772 |
| 2011/0091829 A1 * | 4/2011 | Barve | ............... | F23L 7/005 431/352 |
| 2011/0107765 A1 | 5/2011 | Valeev et al. | | |

FOREIGN PATENT DOCUMENTS

| | | | | |
|---|---|---|---|---|
| DE | 768019 | C | 5/1955 | |
| DE | 102010060363 | A1 | 5/2011 | |
| EP | 2647799 | A2 | 10/2013 | |
| GB | 616635 | A * | 1/1949 | ............... F23R 3/46 |
| GB | 925349 | A | 5/1963 | |

OTHER PUBLICATIONS

U.S. Appl. No. 13/437,953, filed Apr. 3, 2012, Kim et al.
EP Search Report and Written Opinion dated Dec. 4, 2013, issued in connection with corresponding EP Patent Application No. 13184858.2.
Unofficial English Translation of Chinese Office Action issued in connection with corresponding CN Application No. 201310426757.2 on Mar. 17, 2016.

* cited by examiner

CLOCKED COMBUSTOR CAN ARRAY

GOVERNMENT INTEREST

This invention was made with Government support under grant number DE-FC26-05NT42643-ARRA awarded by the Department of Energy. The Government has certain rights in the invention.

TECHNICAL FIELD

The present application and the resultant patent relate generally to gas turbine engines and more particularly relate to an array of non-circular head end combustors arranged in a clocked configuration for coherence reduction and increased component life.

BACKGROUND OF THE INVENTION

Combustor cans in a multiple can array may communicate acoustically with each other. Large pressure oscillations, also known as combustion dynamics, may result when heat release fluctuations couple with combustor can acoustic tones. Some of these combustor can acoustic tones may be in-phase with the tones of an adjacent can while other tones may be out-of-phase. The in-phase tones may excite the turbine blades in the hot gas path if the tones coincide with the natural frequency of the blades. The in-phase tones may be particularly of concern when the instabilities in different combustor cans are coherent, i.e., a strong relationship in the frequency and the amplitude of the instability in one can to the next can. Such coherent in-phase tones may excite the turbine buckets so as to lead to durability issues and thereby limit the operability of the gas turbine engine.

Current solutions to these potentially damaging in-phase coherent tones focus on combustor tuning. Such tuning may provide cans of different volume and length so as to limit the amplitude of the in-phase coherent tones near the bucket natural frequencies as compared to typical design practice limits. These tuning techniques thus may mean that the overall operability space may be limited by the in-phase coherent tones. Moreover, a significant amount of time and resources may be required to achieve frequency avoidance between the combustor and the turbine components. Further, frequency avoidance may only as accurate as the predictive capability used to achieve such.

There is thus a desire for improved systems and methods for coherence reduction between combustor components and turbine components without requiring combustor tuning and other types of conventional frequency avoidance techniques. Preferably, such systems and methods may reduce overall coherence so as to improve component lifetime without compromising system efficiency and output and without requiring extensive modifications.

SUMMARY OF THE INVENTION

The present application and the resultant patent may provide a clocked combustor can array for coherence reduction in a gas turbine engine. The clocked combustor can array may include a number of combustor cans positioned in a circumferential array. A first set of the combustor cans may have a first orientation and a second set of the combustor cans may have a second orientation.

The present application and the resultant patent further may provide a method of operating a combustor can array with reduced coherence. The method may include the steps of positioning a first set of combustor cans at a first orientation, operating the first set of combustor cans in a first tone, positioning a second set of combustor cans at a second orientation, and operating the second set of combustor cans in a second tone.

The present application and the resultant patent may provide a clocked combustor can array for coherence reduction in a gas turbine engine. The clocked combustor can array may include a number of combustor cans positioned in a circumferential array. Each of the combustor cans may include a non-circular head end. A first set of the combustor cans may have a first orientation and a second set of the combustor cans may have a second orientation.

These and other features and improvements of the present application and the resultant patent will become apparent to one of ordinary skill in the art upon review of the following detailed description when taken in conjunction with the several drawings and the appended claims.

DETAILED DESCRIPTION

Figure 1:
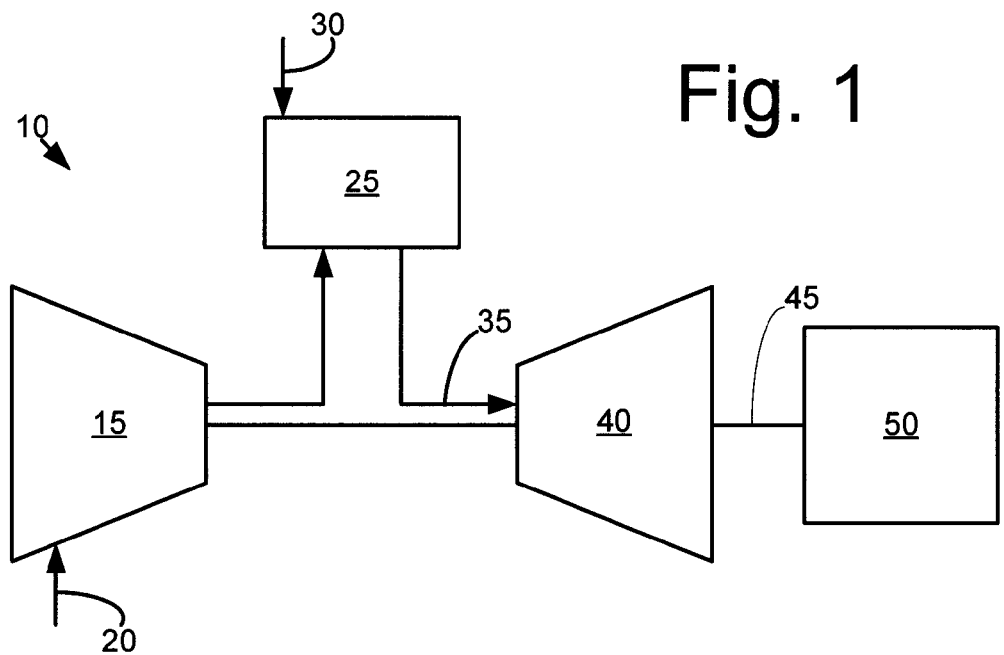
FIG. 1 is a schematic diagram of a gas turbine engine with a compressor, a combustor, a turbine, and a load.

Referring now to the drawings, in which like numerals refer to like elements throughout the several views, FIG. 1 shows a schematic diagram of gas turbine engine 10 as may be used herein. The gas turbine engine 10 may include a compressor 15. The compressor 15 compresses an incoming flow of air 20. The compressor 15 delivers the compressed flow of air 20 to a number of combustor cans 25. The combustor cans 25 mix the compressed flow of air 20 with a pressurized flow of fuel 30 and ignite the mixture to create a flow of hot combustion gases 35. Although only a single combustor can 25 is shown, the gas turbine engine 10 may include any number of combustor cans 25. The flow of the hot combustion gases 35 is in turn delivered to a turbine 40. The flow of the hot combustion gases 35 drives the turbine 40 so as to produce mechanical work. The mechanical work produced in the turbine 40 drives the compressor 15 via a shaft 45 and an external load 50 such as an electrical generator and the like.

The gas turbine engine 10 may use natural gas, various types of syngas, and/or other types of fuels. The gas turbine engine 10 may be any one of a number of different gas turbine engines offered by General Electric Company of Schenectady, N.Y., including, but not limited to, those such as a 7 or a 9 series heavy duty gas turbine engine and the like. The gas turbine engine 10 may have different configurations and may use other types of components. Other types of gas turbine engines also may be used herein. Multiple gas turbine engines, other types of turbines, and other types of power generation equipment also may be used herein together.

Figure 2:
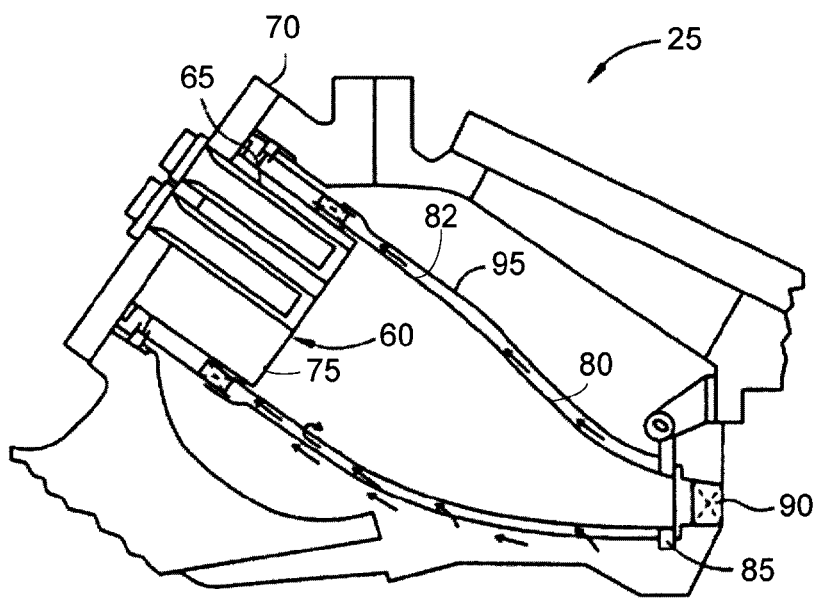
FIG. 2 is a schematic diagram of a combustor as may be used with the gas turbine engine of FIG. 1.

FIG. 2 shows an example of the combustor can 25 that may be used with the gas turbine engine 10. The combustor can 25 may include a head end 60 with a number of fuel nozzles 65 positioned between an end cover 70 and a circular cap 75. A transition piece 80 and a liner 82 may be attached to each other and may extend from the circular cap 75 to an aft end 85 near a first stage nozzle vane 90 of the turbine 40. An impingement sleeve 95 may surround the transition piece 80 and the liner 82 to provide a cooling flow of air thereto. The combustor can 25 described herein is for the purpose of example only. Combustor cans with other components and other configurations may be used herein.

Figure 3:
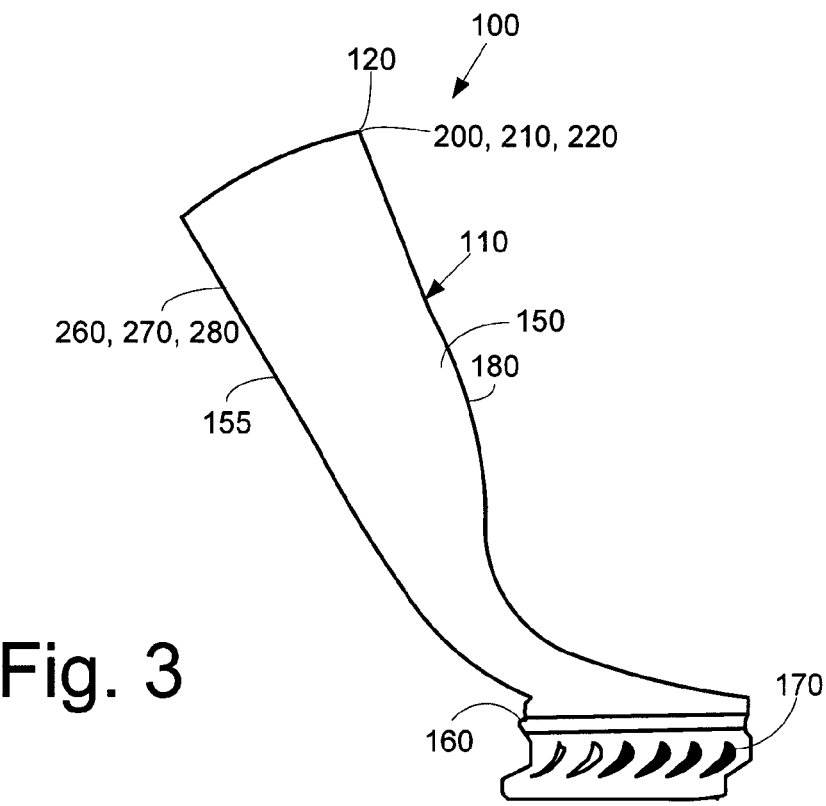
FIG. 3 is a partial perspective view of a combustor with a non-circular head end as may be described herein.
Figure 4:
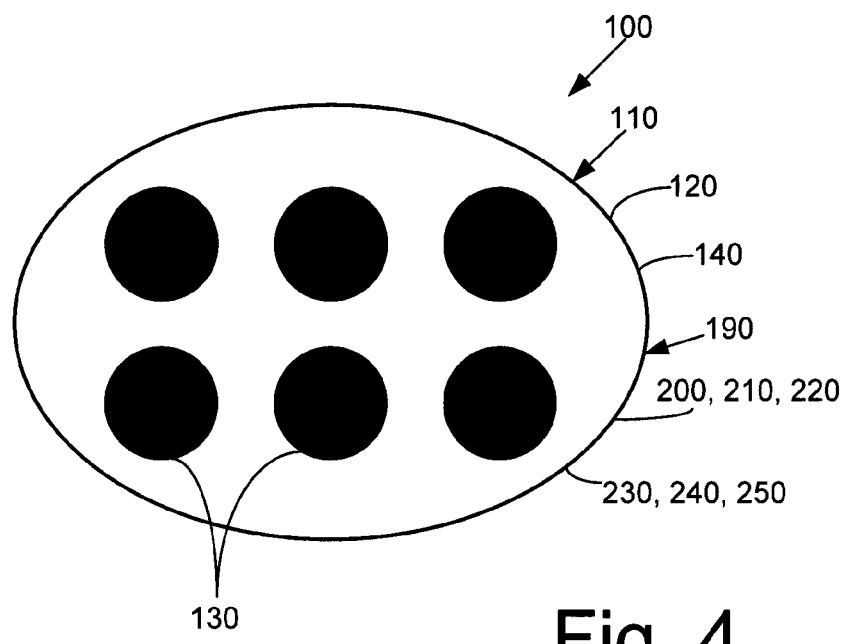
FIG. 4 is a partial sectional view of the non-circular head end of the combustor of FIG. 3.

FIG. 3 and FIG. 4 show a portion of a combustor can 100 as may be described herein. As above, the combustor can 100 may be a one-piece combustor can 110 with an integrated configuration of the transition piece 80, the liner 82, and the first stage nozzle vane 90. Other types of combustors 100 may be used herein with other components and other configurations.

The combustor can 110 may include a head end 120. A number of fuel nozzles 130 may extend from an end cover (not shown) to a cap 140. The combustor can 110 also may be configured as an integrated piece 150. As described above, the integrated piece 150 may include the liner, the transition piece, and the first stage nozzle. The integrated piece 150 may extend from the head end 120 to an aft end 160 about a first stage bucket blade 170 of the turbine 40 and the like. An impingement sleeve 180 may surround the integrated piece 150 so as to provide a flow of cooling air 20 thereto from the compressor 15 or elsewhere. Other components and other configurations also may be used herein.

The head end 120 may have a substantially non-circular configuration 190. The non-circular configuration 190 is not limited to any particular shape. The head end 120 thus may be an oval head end 200, an elliptical head end 210, or any type of substantially non-circular head end 220. Similarly, the cap 140 also may have the non-circular configurations 190. As a result, the cap 140 may be an oval cap 230, an elliptical cap 240, or any type of substantially non-circular cap 250. Likewise, a transition piece 155 of the integrated piece 150 about the head end 120 also may have the non-circular configuration 190 before transitioning into any other shape. As a result, an oval transition piece 260, an elliptical transition piece 270, or any type of substantially non-circular transition piece 280 may be used herein. The combustor cans 110 with the head end 120 having the non-circular configuration 190 thus may promote a more efficient transition of the flow of hot combustion gases 35 to the first stage bucket 170 of the turbine 40 with lower total pressure losses. Other components and other configurations also may be used herein.

Figure 5:
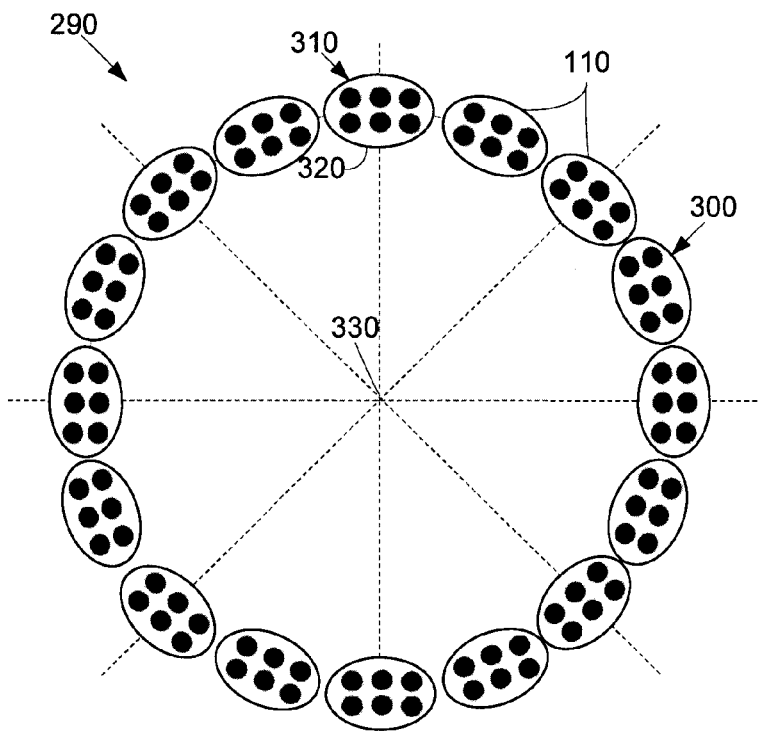
FIG. 5 is a schematic view of a combustor can array.
Figure 6:
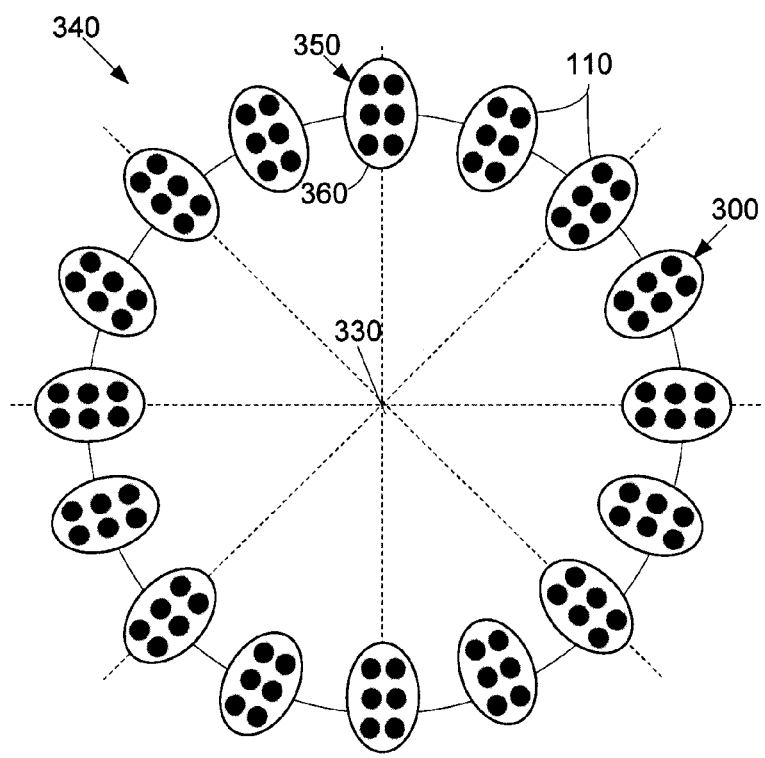
FIG. 6 is a schematic view of an alternative embodiment of a combustor can array.

FIG. 5 shows an example of a combustor can array 290. The combustor can array 290 may include any number of the combustor cans 110. Each of the combustor cans 110 may have the head end 120 with the non-circular configuration 190 such as that described above. The combustor cans 110 may be positioned in a circumferential array 300. In this example, the combustor cans 110 of the combustor can array 290 may have a horizontal position 310 in which a long side 320 of the non-circular configuration 190 faces a center point 330 of the circumferential array 300. FIG. 6 shows a further example of a combustor can array 340. In this example, the combustor cans 110 may have a substantially vertical position 350 in which a short side 360 of the non-circular configuration faces the center point 330. Other components and other configurations may be used herein.

Figure 7:
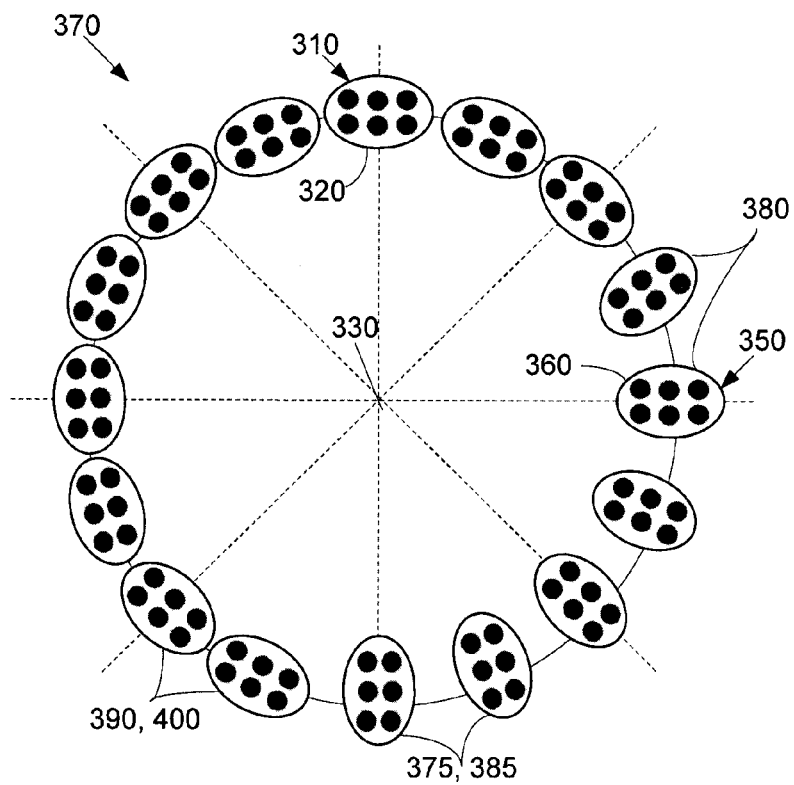
FIG. 7 is a schematic view of a clocked combustor can array as may be described herein.

FIG. 7 shows an example of a clocked combustor can array 370 as may be described herein. In this example, the clocked combustor can array 370 may include a first set 375 of clocked combustor cans 380 in a first orientation 385. The clocked combustor cans 380 may be "clocked" or rotated about ninety degrees (90°) as compared to the combustor can array 290 of FIG. 5 or the combustor can array 340 of FIG. 6 with a second set 390 of the combustor cans in the original or a second orientation 400. Although six (6) clocked combustor cans 320 are shown, any number may be used at any angle.

Figure 8:
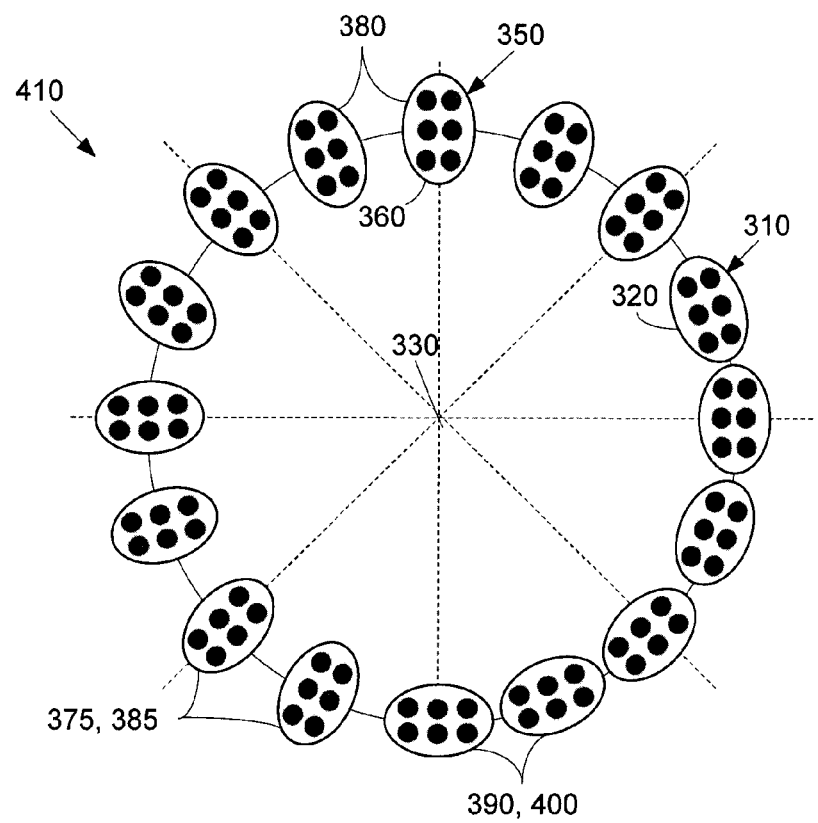
FIG. 8 is a schematic view of an alternative embodiment of a clocked combustor can array as may be described herein.

For example, FIG. 8 shows a clocked combustor can array 410 with a configuration that may be the reverse of that of the clocked combustor can array 370 of FIG. 7. In this example, ten (10) of the combustor cans 110 may be the clocked combustor cans 380 in the first orientation 385 and the remaining six (6) combustor cans 110 may be in their original or second orientation 400. Any combination of combustor cans 110 in any orientation may be used herein. Other components and other configurations may be used herein.

In use, the clocked combustor cans 380 may mitigate interaction between combustor tones and the turbine buckets. As opposed to traditional combustor tuning approaches in which combustor cans of different volumes and lengths may be required for reducing coherence, the clocked combustor arrays described herein maintain uniform combustor sizing while varying the clocking of the combustor cans 110. By altering the circumferential orientation with respect to neighboring combustor cans 110, relative flame characteristics of the individual combustor cans may be effectively changed for reduced coherence.

Figure 9:
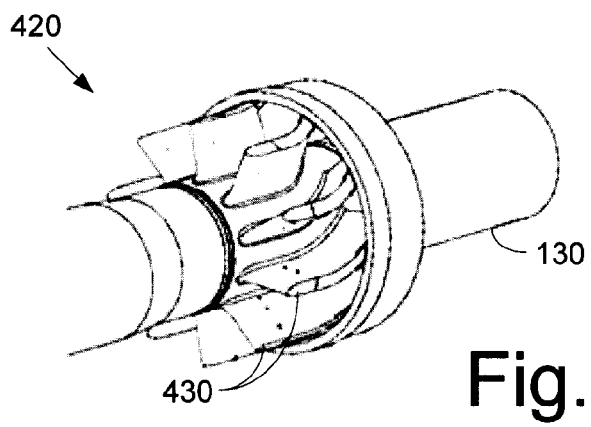
FIG. 9 is a partial perspective view of a fuel nozzle with clockwise swozzle vanes.
Figure 10:
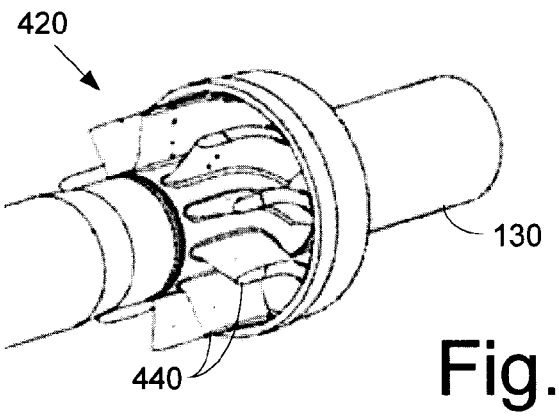
FIG. 10 is a partial perspective view of a fuel nozzle with counter-clockwise swozzle vanes.

FIG. 9 and FIG. 10 show examples of the fuel nozzles 130 that may be used with the combustor cans described herein. The fuel nozzles 130 may have a number of swozzle vanes 420 thereon. The swozzle (swirler+nozzle) vanes 420 may have a number of fuel ports positioned about a number of extending vanes so as to inject a flow fuel 30 into the flow of air 20 so as to promote good premixing. FIG. 9 shows a number of clockwise swozzle vanes 430. FIG. 10 shows a number of counter-clockwise swozzle vanes 440. The clockwise or counter-clockwise vanes 430, 440 thus impart that direction to the flow of air 20 therethrough. The swozzle vanes 420 may have any size, shape, or configuration. Similarly oriented swirler vanes also may be used herein. Likewise, micro-mixers also may be used.

Figure 11:
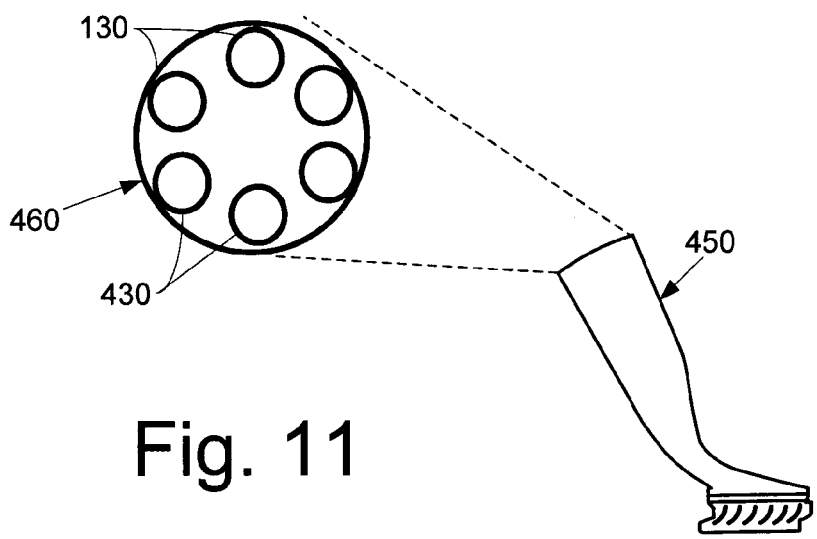
FIG. 11 is a schematic diagram of a combustor with fuel nozzles in a six (6) around zero (0) configuration with clockwise swozzle vanes.
Figure 12:
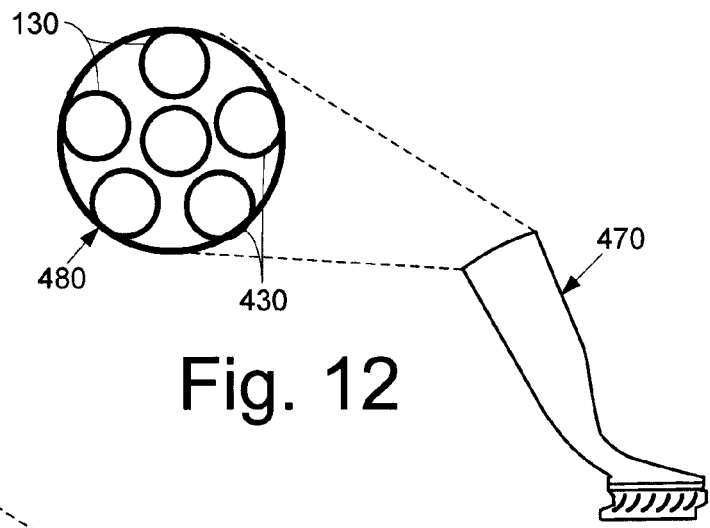
FIG. 12 is a schematic diagram of a combustor with fuel nozzles in a five (5) around one (1) configuration with clockwise swozzle vanes.
Figure 13:
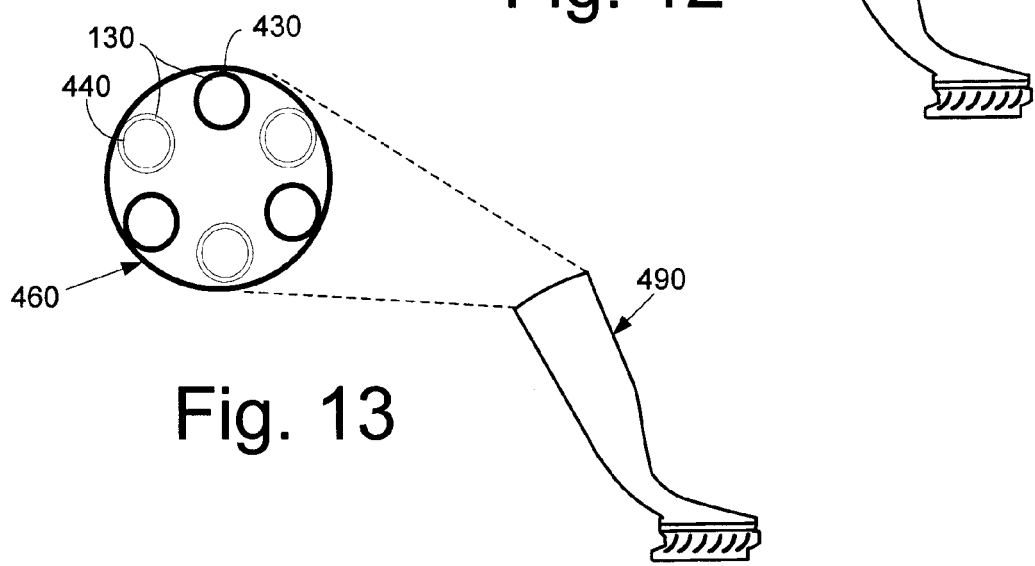
FIG. 13 is a schematic diagram of a combustor with fuel nozzles in a six (6) around zero (0) configuration with fuel nozzle having alternating clockwise swozzle vanes and counter-clockwise swozzle vanes.
Figure 14:
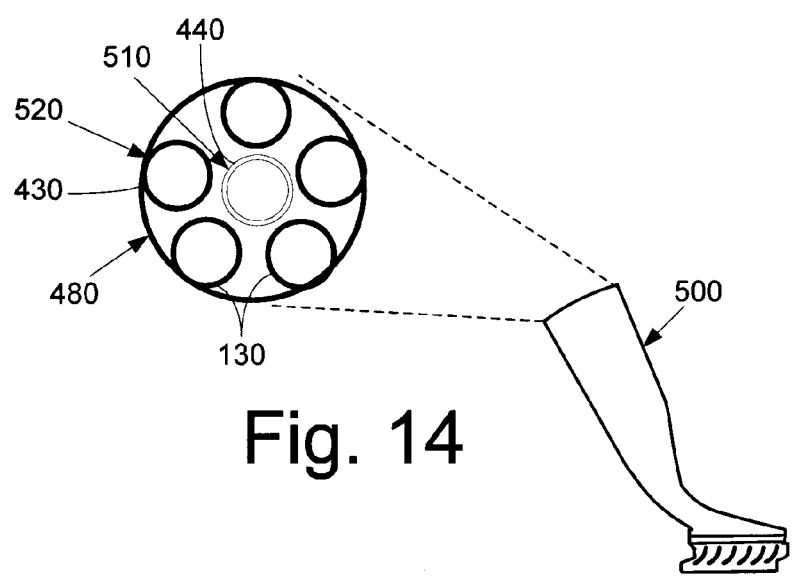
FIG. 14 is a schematic diagram of a combustor with fuel nozzles in a five (5) around one (1) configuration with a center fuel nozzle having counter-clockwise swozzle vanes and the outer fuel nozzles having clockwise swozzle vanes.

FIG. 11 shows a combustor can 450 with six (6) fuel nozzles 130 with the clockwise swozzle vanes 430 in a six (6) around zero (0) configuration 460. FIG. 12 shows a combustor can 470 with a five (5) around one (1) configuration 480. In these examples, all of the fuel nozzles 130 may have the clockwise swozzle vanes 430. FIG. 13 shows a combustor can 490 with the six (6) around zero (0) configuration 460. In this example, the fuel nozzle 130 may have alternating counter-clockwise swozzle vanes 440 and clockwise swozzle vanes 430. FIG. 14 shows a combustor can 500 with the five (5) around one (1) configuration 480. In this example, a center fuel nozzle 510 may have the counter-clockwise swozzle vanes 440 while a number of the outer fuel nozzles 520 may have the clockwise swozzle vanes 430. Any of the fuel nozzles 130 in the combustors described herein may have the clockwise configuration 430 or the counter-clockwise configuration 440 in any number or position.

Figure 15:
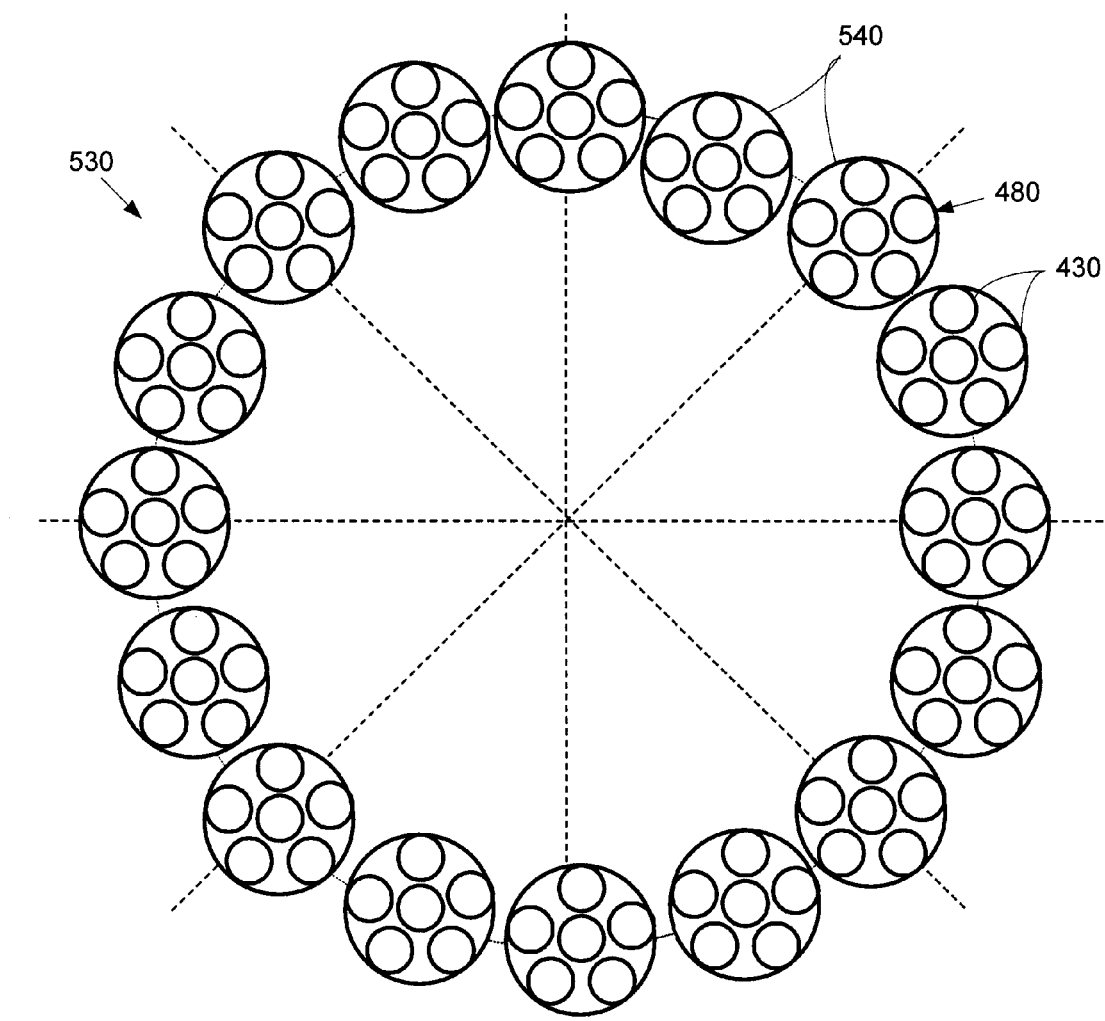
FIG. 15 is a schematic diagram of a circumferential array of combustors with fuel nozzles in a five (5) around one (1) configuration with clockwise swozzle vanes.
Figure 16:
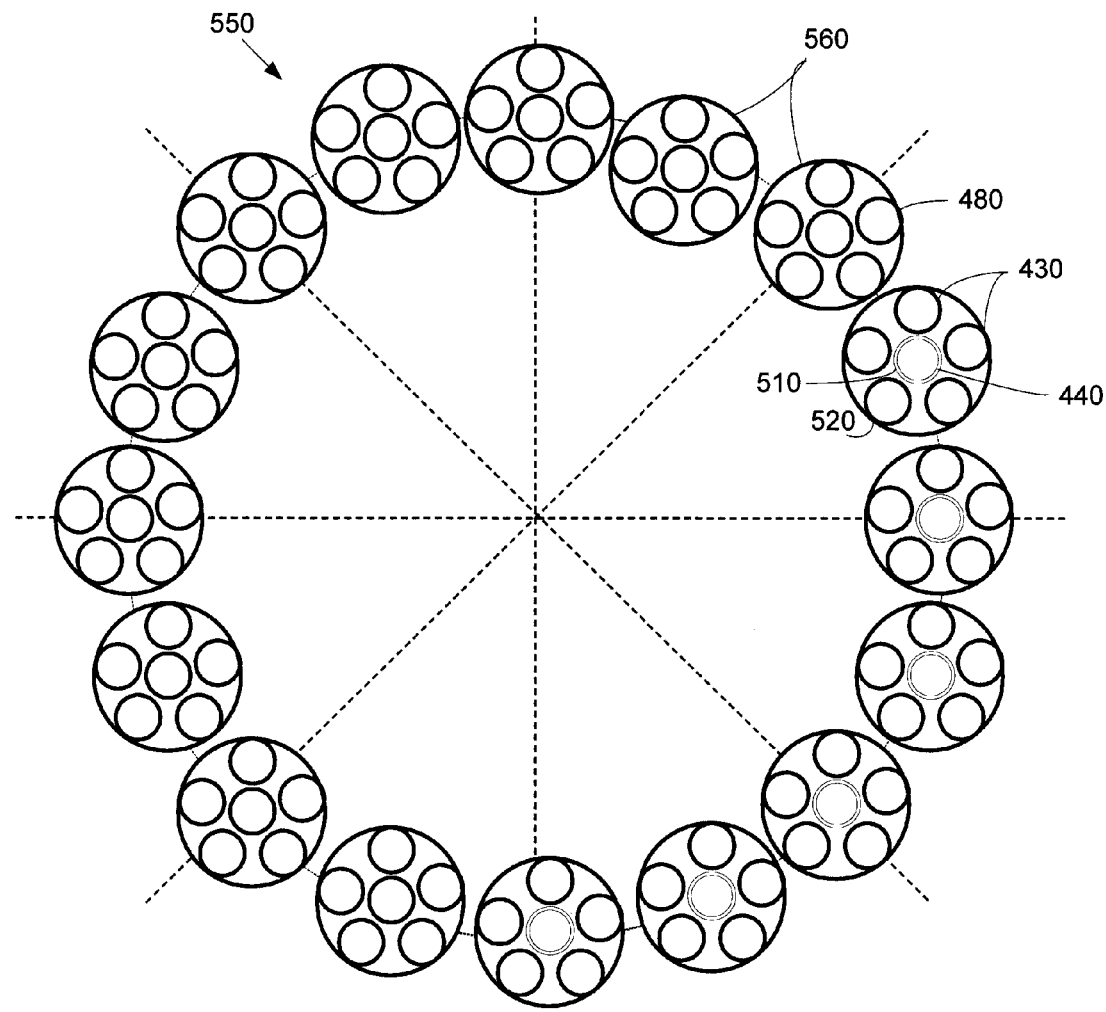
FIG. 16 is a schematic diagram of a circumferential array of combustors in a five (5) around one (1) configuration with some of the center fuel nozzles having a counter-clockwise orientation.
Figure 17:
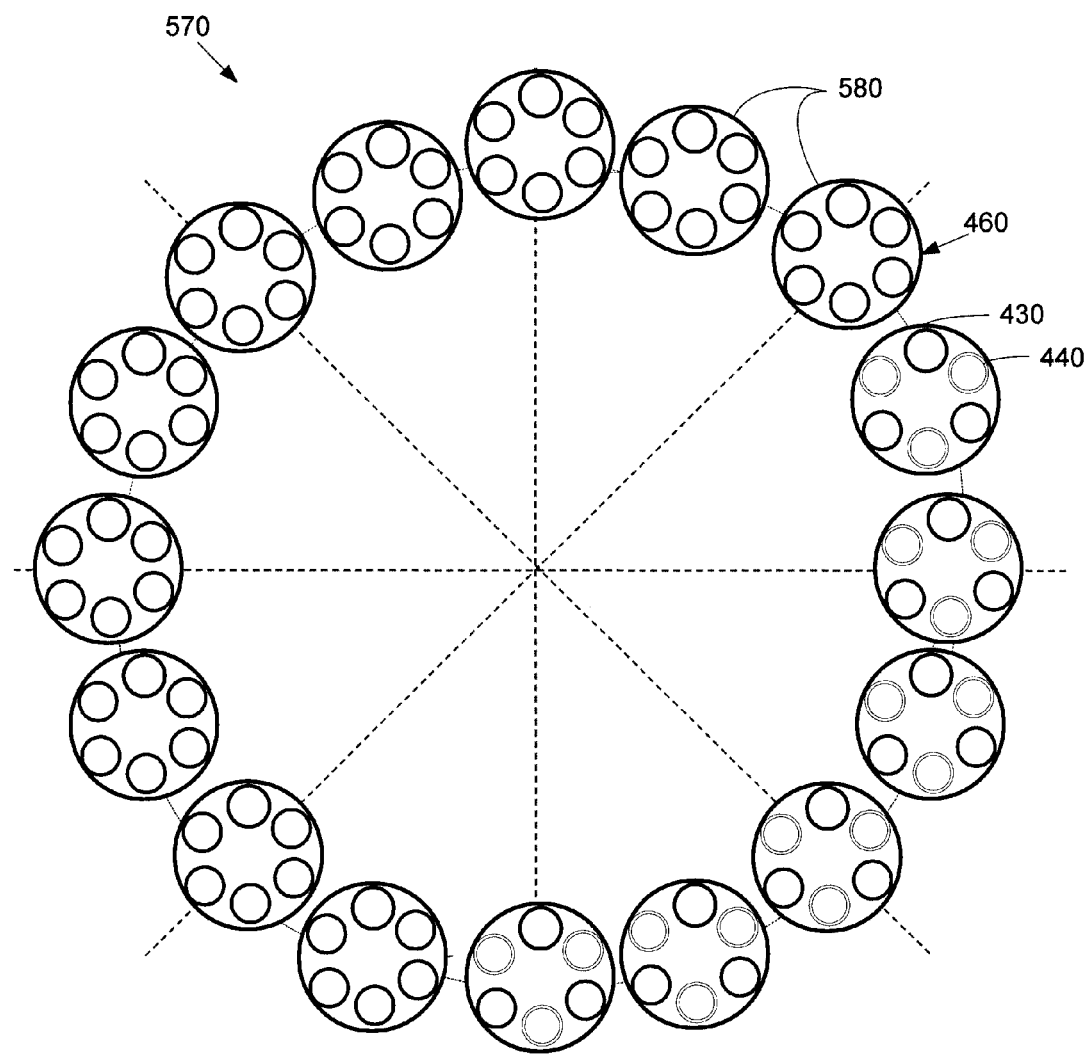
FIG. 17 is a schematic diagram of a circumferential array of combustors in a six (6) around zero (0) configuration with some of the combustors having fuel nozzles with alternating clockwise swozzle vanes and counter-clockwise swozzle vanes.

Likewise, entire arrays of combustor cans may be similarly oriented. FIG. 15 shows a circumferential array 530 with a number of combustor cans 540 in five (5) around one (1) configuration 480 having fuel nozzles 130 with the clockwise configuration 430. FIG. 16 shows a circumferential array 550 with a number of combustor cans 560 having the five (5) around one (1) orientation 480 with a number of the center fuel nozzles 510 having the counter-clockwise orientation 440 while the outer fuel nozzles 520 have the clockwise orientation 430. FIG. 17 shows a circumferential array 570 with a number of combustor cans 580 in the six (6) around zero (0) orientation 460. In this example, the fuel nozzles 130 of certain combustor cans 500 may have the clockwise configuration 430 while the others have the counter-clockwise configuration 440. The circumferential arrays thus may have combustor cans with any configuration and with any type of fuel nozzles and swozzle vanes in any number, position, or direction.

In use, the swozzle vanes 420 may alter the flame characteristics, flame to flame interactions, and corresponding dynamics behavior in either an individual combustor or a circumferential array. Specifically, the direction of the swozzle vanes or other types of vanes may be altered while the remaining hardware configurations may stay substantially unchanged. The use of the swozzle vanes and the like thus may be an alternative and a lower cost approach for coherence breaking as opposed to combustors with different volumes and lengths.

It should be apparent that the foregoing relates only to certain embodiments of the present application and the resultant patent. Numerous changes and modifications may be made herein by one of ordinary skill in the art without departing from the general spirit and scope of the invention as defined by the following claims and the equivalents thereof.

We claim:

1. A clocked combustor can array for coherence reduction in a gas turbine engine, comprising:
    a plurality of combustor cans positioned in a single circumferential array, each of the plurality of combustor cans comprising a non-circular head end of equal size;
    a first set of the plurality of combustor cans comprising a first orientation with a long side facing a center point of the single circumferential array; and
    a second set of the plurality of combustor cans comprising a second orientation with a short side facing the center point of the single circumferential array.

2. The clocked combustor can array of claim 1, wherein the non-circular head end comprises an oval head end or an elliptical head end.

3. The clocked combustor can array of claim 1, wherein the first orientation comprises a clocked position of ninety degrees from the second orientation.

4. The clocked combustor can array of claim 1, further comprising a plurality of fuel nozzles with clockwise vanes thereon.

5. The clocked combustor can array of claim 1, further comprising a plurality of fuel nozzles with counter-clockwise vanes thereon.

6. The clocked combustor can array of claim 1, further comprising a plurality of fuel nozzles with clockwise vanes and counter-clock wise vanes thereon.

7. The clocked combustor can array of claim 1, wherein each of the plurality of combustor cans comprise one piece combustor cans.

8. A gas turbine engine comprising a clocked combustor can array for coherence reduction, the clocked combustor can array comprising:
    a plurality of combustor cans positioned in a single circumferential array;
    each of the plurality of combustor cans comprising a non-circular head end of equal size;
    a first set of the plurality of combustor cans comprising a first orientation with a long side facing a center point of the single circumferential array; and
    a second set of the plurality of combustor cans comprising a second orientation with a short side facing the center point of the single circumferential array.

* * * * *